(12) United States Patent
Steinert (10) Patent No.: US 12,436,381 B2
(45) Date of Patent: Oct. 7, 2025

(54) SCANNING DEVICE FOR SCANNING A SCANNING FIELD, AND METHOD FOR OPERATING SAID DEVICE

(71) Applicant: Carl Zeiss Microscopy GmbH, Jena (DE)

(72) Inventor: Jörg Steinert, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 4 days.

(21) Appl. No.: 18/601,854

(22) Filed: Mar. 11, 2024

(65) Prior Publication Data
US 2024/0310624 A1 Sep. 19, 2024

(30) Foreign Application Priority Data
Mar. 14, 2023 (DE) ...................... 10 2023 202 296.6

(51) Int. Cl.
*G01S 7/48* (2006.01)
*G02B 26/10* (2006.01)
*G01S 7/481* (2006.01)

(52) U.S. Cl.
CPC ......... *G02B 26/101* (2013.01); *G02B 26/105* (2013.01); *G01S 7/4817* (2013.01)

(58) Field of Classification Search
CPC .... G02B 26/101; G02B 26/105; G01S 7/4817
See application file for complete search history.

(56) References Cited

U.S. PATENT DOCUMENTS

| 5,982,528 A | * | 11/1999 | Melville | G02B 26/105 359/224.1 |
| 6,245,590 B1 | * | 6/2001 | Wine | G09G 3/025 73/579 |
| 2011/0279879 A1 | * | 11/2011 | Wakabayashi | G02B 26/101 359/197.1 |
| 2023/0098021 A1 | * | 3/2023 | Hajjar | G02B 26/101 359/201.1 |

FOREIGN PATENT DOCUMENTS

| DE | 102015103164 A1 | 9/2016 |
| JP | 2022102572 A | 7/2022 |

OTHER PUBLICATIONS

Wang, D.; Watkins, C.; Xie, H., "Mems Mirrors for LiDAR: A Review", Micromachines 2020 (11):456, 24 pages.

* cited by examiner

*Primary Examiner* — Kevin K Pyo
*Assistant Examiner* — Don J Williams
(74) *Attorney, Agent, or Firm* — DUANE MORRIS LLP (57) ABSTRACT

A scanning device for scanning a scan field, and a method for operating the device, said scanning device having a first scanner and a second scanner, each with a frame that is movable about a first oscillation axis and, held in said frame a scanning mirror that can be excited resonantly to vibrate about a second oscillation axis. The scanners are arranged in a beam path and imaged onto one another. Their spatial and temporal alignments are matched to one another by means of a controller and by means of drives of the scanners connected therewith, for the purpose of scanning the scan field. Each scanner is a 2-axis scanner whose respective first oscillation axis is directed orthogonally to the respective second oscillation axis.

7 Claims, 4 Drawing Sheets

SCANNING DEVICE FOR SCANNING A SCANNING FIELD, AND METHOD FOR OPERATING SAID DEVICE

RELATED APPLICATION

The present application is a U.S. National Stage application of German Application No. DE 10 2023 202 296.6 filed on Mar. 14, 2023, the contents of which is herein incorporated by reference in its entirety.

FIELD OF THE INVENTION

The invention relates to a scanning device for scanning a scan field, and to a method for operating a scanning device according to the invention.

BACKGROUND OF THE INVENTION

A resonance scanner for scanning an object to be scanned (sample) row-by-row is usually used to acquire images of the sample by means of a scanning optical device, in particular by means of a scanning microscope.

In this case, scanning is implemented along the row (scan row) within a short period of time (fast axis). In order to acquire a plurality of rows, the alignment of the scanner is offset parallel to the already acquired scan row in incremental or continual fashion for the purpose of acquiring the next row. Scanning is usually implemented sinusoidally. In this context, the direction of the offset is usually referred to as slow axis.

The scan along the fast axis is usually implemented technologically using a resonance scanner while the feed along the slow axis is created using for example a Galvano scanner (quasi-static scanner).

A disadvantage of the prior art is that an orientation of the image recording, i.e. the alignment of the scan field to be scanned, cannot be rotated freely but is instead defined. The scanning speed cannot be varied either. If the intention is to change from a resonant scan to a non-resonant scan, it is necessary to exchange the scanner or modify the beam path.

It is possible to use so-called 2-axis scanners which combine a quasi-static scanner for the feed along the slow axis and a resonant scanner for the feed along the fast axis. For example, such scanning systems are known from Wang, D. et al. 2020 (Micromachines 11; 456; doi: 10.3390/mi11050456).

However, the problem relating to the rotatability of the scan field is not solved therewith. DE 10 2015 103 164 A1 has disclosed a superimposition of the movements of two combined scanners, which allow a rotation of the scan field through 45°. However, the combined scanners disclosed in DE 10 2015 103 164 A1 are designed specifically for an offset correction.

SUMMARY AND OBJECTS OF THE INVENTION

The invention is based on the object of proposing an option allowing a rotation of a scan field during a scanning scan.

The object is achieved for a scanning device and for an operating method.

The scanning device of the invention is configured to scan a scan field, the scan field being scanned by means of an illumination radiation, preferably a shaped illumination radiation.

The scanning device has a first scanner and a second scanner, each scanner having a frame that is movable about a first oscillation axis and, held in said frame, a scanning mirror that can be excited resonantly to vibrate about a second oscillation axis. The frame operates as a quasi-static scanner and does not operate resonantly; instead, it is deflected continually or incrementally by means of a drive.

The scanners are arranged in a beam path of the scanning device and imaged onto one another. In relation to a respective rest position or zero position, the two scanners are in this case arranged with respect to one another at an angle of more than zero degrees and no more than 90 degrees. A spatial and temporal alignment of the scanners, i.e. their vibration or oscillation behaviour or their alignment, is matched to one another by means of a controller and by means of drives of the scanners connected therewith, for the purpose of scanning the scan field. In particular, the scan field is predetermined by a configuration of the scanning device or can for example be selected by a user.

According to the invention, the scanning device has the further feature that each scanner is a 2-axis scanner whose respective first oscillation axis is directed orthogonally to the respective second oscillation axis.

The two oscillation axes are aligned rotated relative to one another, preferably orthogonal to one another, in a scanning device according to the invention.

The invention allows the scan field to be rotated freely in simple fashion within the technical framework provided by the scanning device. Moreover, the invention opens up the option of using already available and correspondingly cost-effective 2-axis scanners without needing to resort to a very specific solution, for example as described in DE 10 2015 103 164 A1.

To simplify matters, the 2-axis scanners are also referred to as scanners within the scope of the further description. The terms frame and quasi-static scanner are used synonymously. The terms scanning mirror and resonant scanner are also used correspondingly.

As a result, a row of a scan field (scan row) is scanned by means of a resultant scan line. In the description below, the terms scan row, scan line and resultant scan line are used synonymously unless a specific meaning is expressly referred to in the specific context.

In an advantageous embodiment of the scanning device, the two scanners are arranged at a respective angle of incidence of 45° with respect to the beam path. In the case of such an arrangement of the scanners, there are few distortions as a consequence of the scanning movements.

The scanners being identical, or at least similar, is advantageous both from a constructional point of view and in view of the required control thereof. Firstly, this can be achieved by using scanners of the same design. In an alternative, use can also be made of scanners which have the same vibration or oscillation parameters, i.e. which ultimately behave like scanners of the same design.

The two resonant scanning mirrors must have a sufficiently similar resonant frequency such that they can be operated with a sufficient amplitude at the same frequency. For example, the scanners or resonant scanning mirrors can be selected by pairing or sorting various scanners.

The quality of the resonances arising and the magnitude of the deviation of the resonant frequencies of the scanning mirrors from one another are important in the context of the invention. The two scanning mirrors should have a sufficiently large resonance magnification at a chosen scanning frequency in order to be able to simultaneously operate both with a sufficient amplitude. A higher quality requires more accurate matching of the scanning frequencies to one another.

The scanning device according to the invention may also have position detectors for acquiring a current amplitude and phase of each resonant scanning mirror and optionally of the quasi-static scanners. The position detectors are control-connected to the controller; thus, there is the option of exchanging data or transmitting data therebetween.

A possible drift of the vibration or oscillation parameters can be identified, and corrected accordingly, on the basis of the position detector data. For control purposes, it is possible to modify the amplitudes and phases of the excitation curves of both scanners, in particular of both scanning mirrors, such that these vibrate in phase and with the desired amplitude about both resonant oscillation axes (second oscillation axes). Moreover, the operating frequency of the scanning mirrors can be adapted, e.g. in small increments, in order to attain an optimized operation of the scanning device.

To compensate for possible deviations of the scanning movement from a desired scanning movement, for example from an ideal sinusoidal scanning movement, it is possible to respond with an appropriate correction in an excitation signal. For example, harmonics can be added or amplitudes or phases of the fundamental wave and/or of harmonics can be adapted. Thus, a well-balanced bidirectional scan of the scan field is possible, for example even if minor nonlinearities occur.

The controller is advantageously configured to create control commands and, by means of the created control commands, regulate the respective amplitudes and phases of the scanning mirrors of the first scanner and second scanner. In this case, the amplitudes of the scanners, specifically a first amplitude of the scanning mirror of the first scanner and a second amplitude of the scanning mirror of the second scanner, are set depending on a currently selected alignment, which is to be scanned, of the scan field. Advantageously, data provided by the position detectors are taken into account when creating the control commands for bringing about the first and second amplitudes and for regulating the latter during the scanning procedure. For example, feedback control of the amplitudes can be realized in this way.

Controlling the amplitudes relates to the vibration or oscillation behaviour of the resonant scanning mirrors. Advantageously, the controller is also configured for open-loop and optionally closed-loop control of the respective positions of the frames, i.e. the quasi-static components of the scanners.

The scanning device may be designed to create a scan line and optionally scan a scan field using an illumination radiation. In a further embodiment of the scanning device, the latter can be alternatively or additionally used to acquire image information from the scan field. For example, a beam splitter may be present in a beam path of the scanning device and the effect of said beam splitter may lead to a detection radiation arriving from the scan field being steered into a detection beam path. A detector for capturing the detection radiation is arranged in the detection beam path and optionally has disposed upstream thereof a pinhole, for example in the form of a perforated stop.

The scanning device is advantageously arranged in the beam path of a scanning microscope, for example a laser scanning microscope (LSM). The invention therefore also encompasses a microscope having a scanning device according to the invention, in particular an LSM.

The object is also achieved by a method for operating the scanning device. The method comprises a definition of a current scan field to be scanned. A scanning regime, according to which the scan field is intended to be scanned in space and/or in time, is also defined.

The first and second amplitudes, which are required for the scanning according to the selected scanning regime, and the required phases of the first and second scanning mirrors are ascertained in a further step of the method. While an angle of rotation of a scan line resulting from the superimpositions is determined by the choice of the first and the second amplitudes, a rotary direction of the scan line is determined by the respective phase angles of the vibrations or oscillations of the resonant scanning mirrors to one another (see below).

To optionally scan the scan field along the slow axis, a respective scan line must be displaced to the next scan row. Thus, the respective positions of the frames of the two scanners required for scanning the current scan field are ascertained in a further method step.

If this information is available, the scan field can be scanned by means of at least one created scan line by virtue of the movements of the scanning mirrors being spatially and temporally superimposed on one another and the scan line being created as a resultant scan line of the superimpositions. The scan line is optionally offset in order to scan the scan field in the direction of the slow axis.

A few technical requirements and variants of the operation of the scanning device are described below.

A substantial advantage of the invention consists in the fact that a scan field can be aligned and scanned at freely selectable angles of rotation. In order to scan the scan field with an angle of rotation of 0 degrees For example, the first scanning mirror of the first scanner vibrates about the second oscillation axis of the first scanner and hence scans the scan field along the fast axis. The second scanner is controlled such that the frame (quasi-static scanner) is displaced orthogonal thereto and, in a manner matched to the scanning movement of the first scanning mirror, from row to row (slow axis). There is no resonant vibration or oscillation of the second scanning mirror about the second oscillation axis of the second scanner.

If the same scan field should be scanned at an angle of rotation of 90°, the two scanners are controlled conversely, with the result that they exchange their functions. Thus, the first oscillation axis of the first scanner (quasi-static oscillation axis of the frame) jumps from scan row to scan row while the scanning mirror of the second scanner vibrates resonantly about the second oscillation axis of the second scanner.

For scanning at any chosen angle of rotation, the two scanning mirrors are operated at the same frequency and with the same phase. In the process, the rotation angle is determined by the ratio of the first amplitude to the second amplitude.

Figure 3:
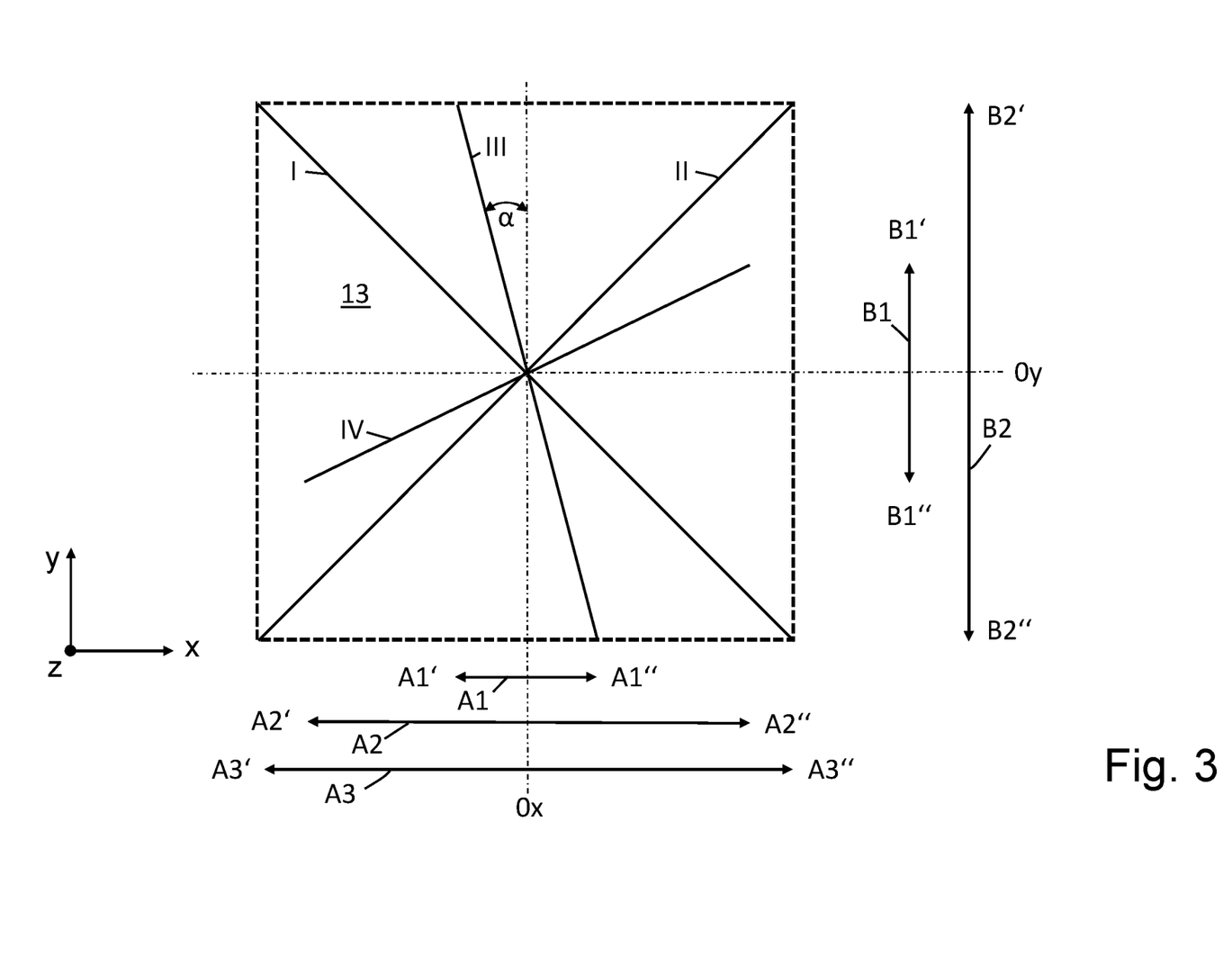
FIG. 3 is a schematic illustration of resultant scan lines in the case of different amplitude ratios of the resonant oscillation axes of the first and second scanning mirrors.

The relation of the current vibration or oscillation direction of the two scanning mirrors within a vibration or oscillation period determines the resultant rotary direction of the scan line created as a consequence of the superimposition of the vibrations or oscillations of the two scanning mirrors (see also FIG. 3 in this respect). The vibration or oscillation direction is determined by the current direction of the vibration or oscillation from or to one of the reversal points of a resonant vibration or oscillation.

An angle of rotation of $\Delta=45$ degrees arises if the amplitudes are the same for both scanning mirrors. The two quasi-static scanners can be controlled such that these jump simultaneously from scan row to scan row synchronously with the vibration or oscillation of the scanning mirrors. In the process, their amplitude is inversely adapted accordingly, resulting in a displacement of the scan line perpendicular to the fast scanning direction.

A linearized resonant scanner can be used for the resonant axes of the 2-axis scanner for the purpose of obtaining a linear scan profile.

The frequency for the resonant axes can be adapted to the two resonant frequencies of the two scanners, depending on the desired angle of rotation. Thus, when operating the scanning device with a scanning field rotation of 0 degrees or 90 degrees, the only used resonant scan axis can be operated very close to, or at, its resonant frequency. In the case of a slightly rotated scan field, the frequency can, as a compromise, be placed correspondingly close to the resonant frequency of the scanning mirror operated with the greater amplitude. Thus, the resonance magnification of the two scanners can be balanced by way of the choice of the operating frequency, with the result that e.g. the exciting force or energy is chosen to be the same for both scanning mirrors or e.g. minimized in total for both.

The scanning device according to the invention can advantageously be converted to a quasi-static operation, in which the scanning frequency is freely selectable and an exactly linear scanning movement, i.e. a resultant triangular scanning movement, is possible. To this end, the two scanning mirrors are kept constant, for example by virtue of these being deenergized.

To extend the attainable scanning frequencies and amplitudes during quasi-static operation, the two scanning mirrors can be used in a further method configuration to linearize the scan curve using an appropriate harmonic. For example, the quasi-static oscillation axes then run sinusoidally, while the respective scanning mirror scans using a third harmonic.

Alternatively, the frames can be operated in part-linearized fashion and e.g. excited by two harmonics, for example by the first and third harmonic. By way of an appropriate excitation of the scanning mirror, it is possible to contribute the next higher harmonic, for example the fifth harmonic, for linearization purposes.

Should the scanning mirror represent a linearized scanner which is excited by three harmonics for example, it may accordingly contribute more harmonics. It is also possible that the scanning mirror also contributes the next higher harmonic in addition to the harmonic operated at resonance, even without resonance magnification.

Both unidirectional and bidirectional scanning can be performed by means of the invention.

BRIEF DESCRIPTION OF THE DRAWINGS

The invention is explained in more detail below on the basis of exemplary embodiments and drawings, in which.

DETAILED DESCRIPTION OF AN EMBODIMENT OF THE INVENTION

Figure 1:
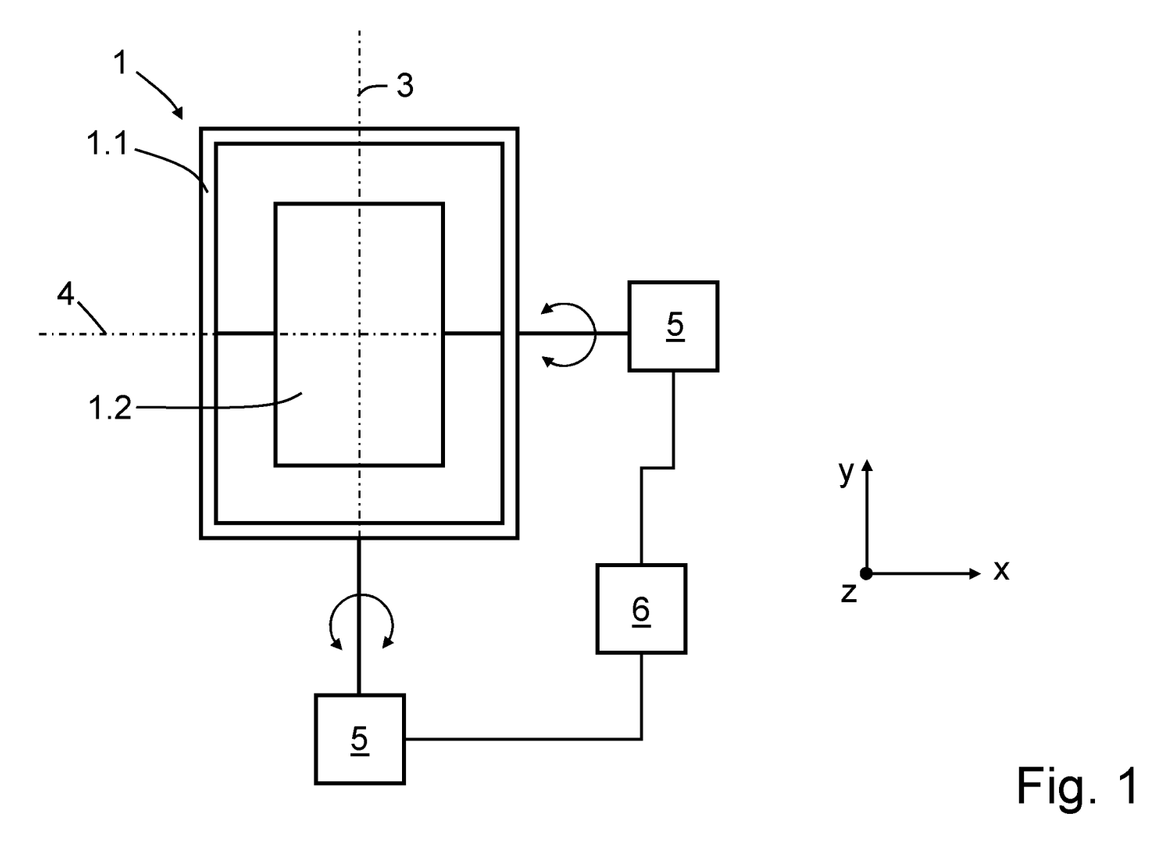
FIG. 1 is a schematic illustration of a 2-axis scanner with drives and a controller in a plan view.

FIG. 1 illustrates a scanner 1 having a first quasi-statically operated scanner in the form of a first frame 1.1 and a first scanning mirror 1.2 which is operated resonantly. The frame 1.1 is rotatable about a first oscillation axis 3 of the frame 1.1 by means of a drive 5 while the first scanning mirror 1.2 is rotatable about a second oscillation axis 4 of the scanner 1 and in particular is able to vibrate about a zero position of the second vibration axis 4. The first scanning mirror 1.2 can be excited to vibrate in controlled fashion by means of a further drive 5. The drives 5 are connected to a controller 6 in a manner that is suitable for exchanging data.

In the example of FIG. 1, the first scanner 1 extends in an xy-plane. In this case, the first oscillation axis 3 is aligned in the direction of the y-axis and the second oscillation axis 4 is aligned in the direction of the x-axis, with the first and second oscillation axes 3, 4 being aligned orthogonal to one another.

Two of the scanners 1, 2 described in relation with FIG. 1 are comprised by a scanning device 0 according to the invention, which may optionally be present in a microscope M (FIG. 2), for example in a laser scanning microscope M.

Figure 2:
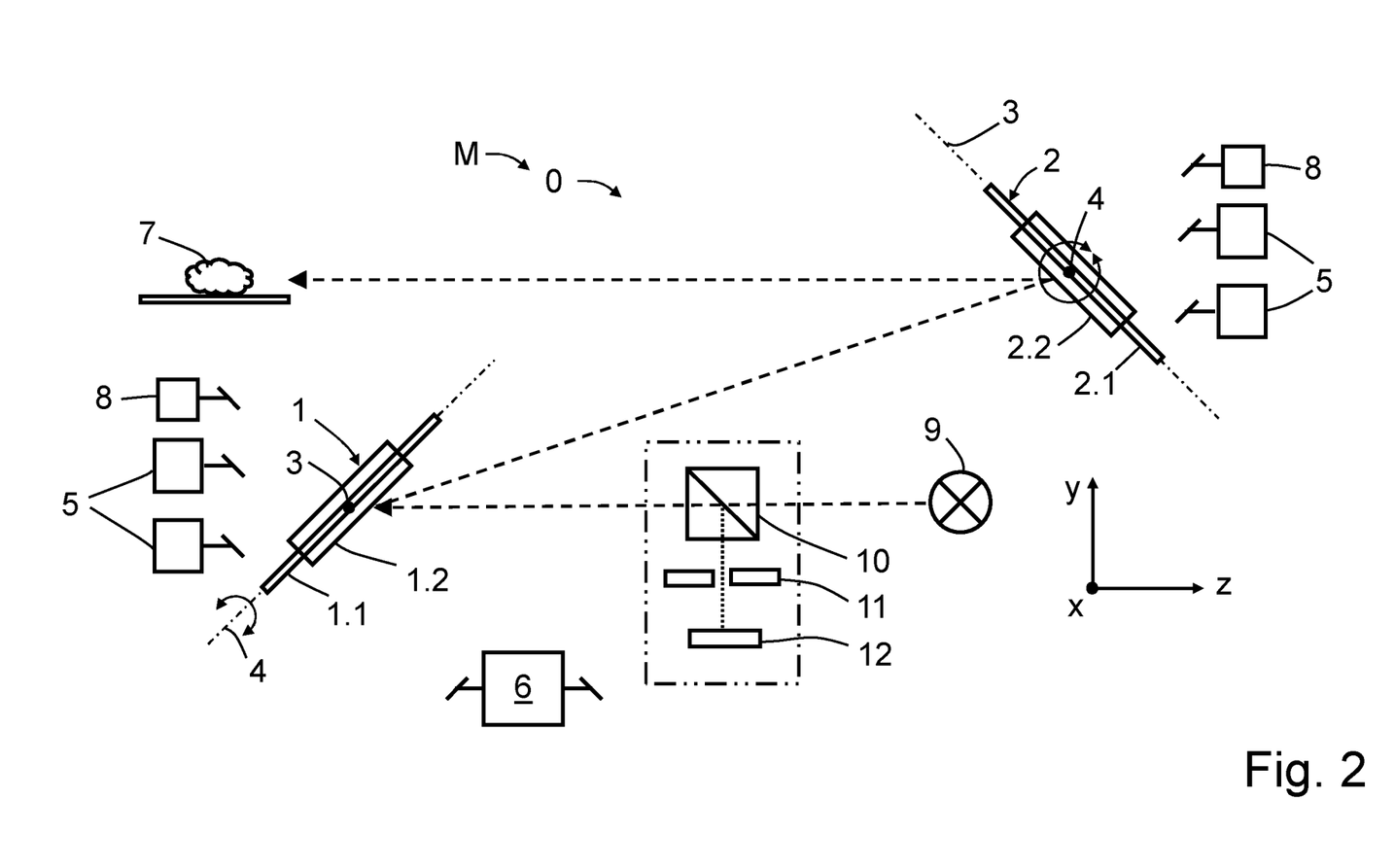
FIG. 2 is a schematic illustration of an exemplary embodiment of a scanning device according to the invention in a side view.

Excitation radiation emitted by a light source 9 reaches the first scanner 1 along a beam path (symbolized by a dashed line) and is incident on the first scanning mirror 1.2 at said first scanner. With regard to its second oscillation axis 4, the first scanner 1 is inclined by 45 degrees with respect to the beam path. The excitation radiation is reflected by the effect of the first scanning mirror 1.2 and projected at the second scanning mirror 2.2 of the second scanner 2. The second scanner 2 is inclined by −45 degrees with respect to the beam path, with the result that the beam path downstream of the second scanner 2 again runs parallel to the course of the non-reflected portion of the beam path. The beam path is directed into a sample space, in which a sample 7 can be arranged.

In order to scan the sample 7 using the excitation radiation, at least over the extent of a scan field 13 (see FIGS. 3 and 4), the first scanning mirror 1.2 is excited to vibrate about the second oscillation axis 4, located in the plane of the drawing, of the first scanner 1. As a result, the excitation radiation is scanned, i.e. deflected repeatedly, in the direction of the x-axis after leaving the first scanner 1.

The scanning mirror 2.2 of the second scanner 2 vibrates resonantly about the second oscillation axis 4, with the latter running in the direction of the x-axis. The first oscillation axis 3 of the second scanner 2 lies in the plane of the drawing.

As a result of the effect of the vibration or oscillation of the second scanning mirror 2.2 about the second oscillation axis 4, the deflection of the excitation radiation caused by the first scanning mirror 1.2 is superimposed with a further deflection about the x-axis and directed at the sample 7.

Optionally, position detectors 8 may be present, which are used to acquire respective current alignments of the scanners 1, 2 or of their frames 1.1, 2.1 and scanning mirrors 1.2, 2.2. This information is transmitted to the controller 6 and evaluated for open-loop control purposes or for necessary closed-loop control.

It is also optionally possible for a beam splitter 10 to be present in the beam path, for example between light source 9 and first scanner 1, the effect of said beam splitter being such that the excitation radiation is transmitted but a detection radiation traveling along the beam path and originating from the sample 7 is reflected into a detection beam path (represented by a dotted line). In further embodiments, the beam splitter can also be operated in reflection for the excitation and in transmission for the detection. Both variants are known from the prior art.

A pinhole 11, for example in the form of a perforated stop, can be arranged in the detection beam path (framed by a dot-dot-dashed line). A detector 12 configured to capture the detection radiation is present downstream thereof. In this embodiment, a confocal detection beam path used to capture the descanned detection radiation is formed. In further embodiments, the pinhole 11 can be adjustable in terms of its aperture size and/or be interchangeable.

The effects of superimpositions of the vibrations or oscillations of the two scanning mirrors 1.2, 2.2 are illustrated by way of example in FIG. 3 for a few cases.

Shown by way of example is a scan field 13 in an xy-plane, in which four different scan lines I, II, III and IV have been created.

Depicted by way of example along the x-axis are the amplitudes A1, A2 and A3, with which the first scanning mirror 1.2 respectively resonantly vibrates around a zero position 0x about the second oscillation axis 4 of the first scanner 1. In addition to the label of the relevant amplitude, the reversal points of the vibrations or oscillations have been denoted with one apostrophe in one direction and with two apostrophes in the other direction.

Shown analogously in the direction of the y-axis are two amplitudes B1 and B2, with which the second scanning mirror 2.2 respectively resonantly vibrates around a zero position 0y about the second oscillation axis 4 of the second scanner 2.

The scanning mirrors 1.2 and 2.2 vibrate at the same frequency and with the same phase, to the extent that a vibration or oscillation of both scanning mirrors 1.2, 2.2 starts and ends simultaneously.

The interaction of the vibrations or oscillations is explained using the example of the scan line I resulting from a superimposition of two vibrations or oscillations of the two scanning mirrors 1.1 and 2.2. The first scanning mirror 1.2 vibrates in the direction of the x-axis around a zero position 0x with the amplitude A3 while the second scanning mirror 2.2 vibrates in the direction of the y-axis with the amplitude B2 around the corresponding zero position 0y.

For a better illustration, the respective vibrational or oscillation movements are explained, starting from in each case one of the reversal points of the relevant amplitude representations.

In the case of the scan line I, the vibrational or oscillation movement starts at a pair of reversal points denoted by A3' and B2'. The vibrational or oscillation movements of the two scanning mirrors 1.2, 2.2 start simultaneously (same phase) and end at the same time (same frequency). As a result, the scan line I, which is inclined by an angle of rotation α of −45° with respect to the zero position 0x, is created as a consequence of the superimposition of both vibrational or oscillation movements. The same result is obtained if the vibrational or oscillation movements start at the pair A3" and B2" and end at the pair A3', B2' (=return vibration or oscillation).

By contrast, if the vibrational or oscillation movements start at either of the pairs A3', B2" and A3", B2' (and back) and if these are implemented in turn with the same phase and at the same time, then the scan line II is created as a result, the latter being inclined by 90° (angle of rotation α=45) with respect to the scan line I.

The angle of rotation α of the respective scan lines is determined by the respective amplitudes of the scanning mirrors 1.2, 2.2. In a case not depicted here, the amplitude of the first scanning mirror 1.2 could equal zero degrees, while the second scanning mirror 2.2 vibrates with an amplitude B2. In this case, a scan line would be determined only by the second scanning mirror 2.2 and would extend vertically.

In a further exemplary case, the first scanning mirror 1.2 vibrates with the amplitude A1 and the second scanning mirror 2.2 vibrates with the amplitude B2. The vibrational or oscillation movement is implemented starting from one of the pairs A1', B2' and A1", B2", respectively (vibrational or oscillation direction). The superimposition of these vibrational or oscillation movements results in the scan line III, the angle of rotation α of which is 15 degrees with respect to the zero position 0x, for example.

It is also possible that the maximum possible amplitudes of the two scanning mirrors 1.2, 2.2 are not exploited. For example, the first scanning mirror 1.2 can vibrate with the amplitude A2 and the second scanning mirror 2.2 can vibrate with the amplitude B1, starting from one of the pairs A2', B1" and A2", B1', respectively. The scan line IV is created as a result.

Figure 4:
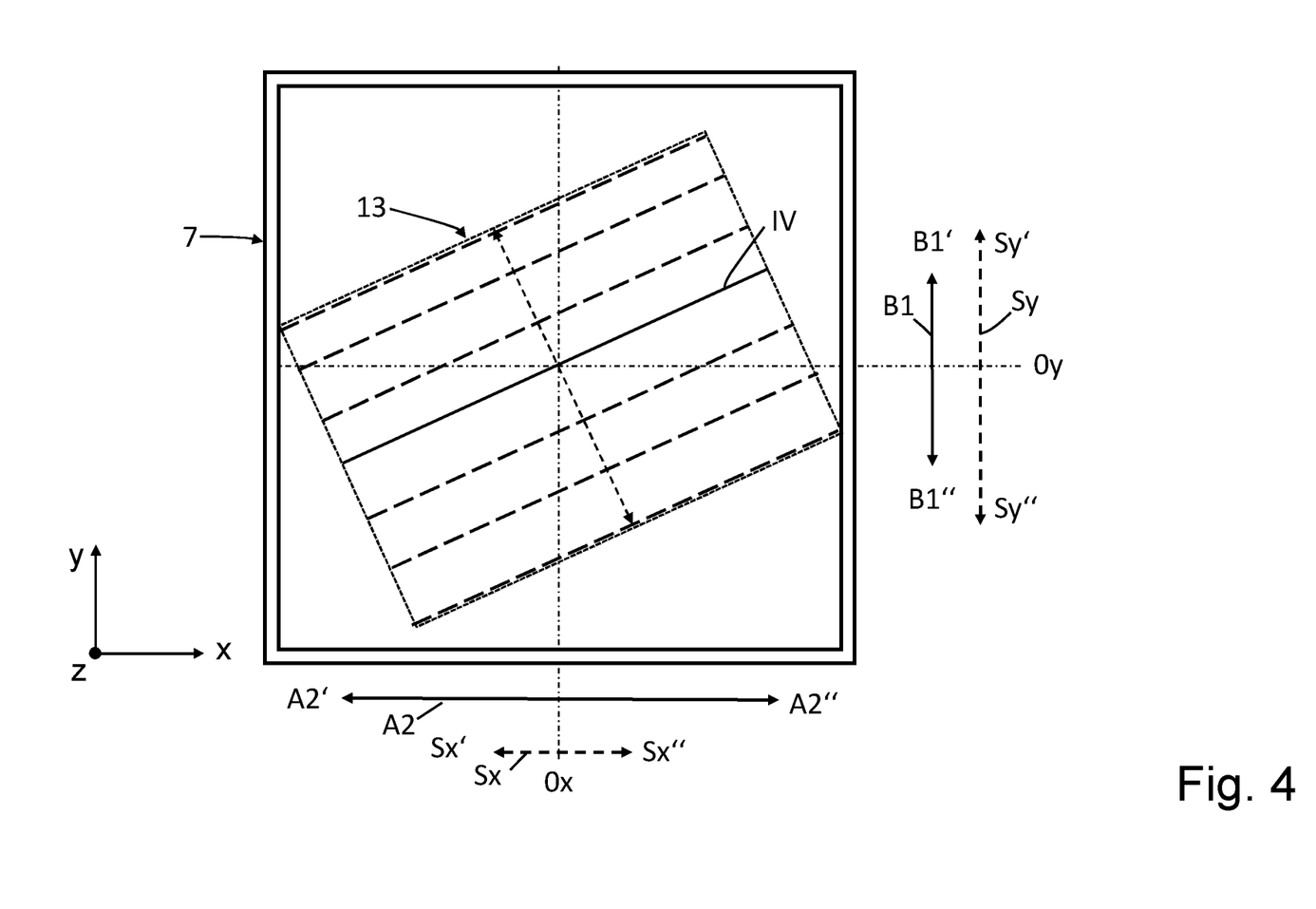
FIG. 4 is a schematic illustration of a configuration of the method according to the invention with a rotated scan field.

To scan a scan field 13, for example on a sample 7, it is necessary to systematically displace the created scan lines I, II, III or IV. This is implemented by virtue of the two quasi-static scanners 1.1 and 2.1 (frames 1.1, 2.1) being driven in correspondingly synchronized fashion. FIG. 4 shows, by way of example, the scan line IV which is offset incrementally along the scan field 13 (quasi-static deflections) as a consequence of the superimposition of incremental positional changes of the first frame 1.1 along the path Sx with end points Sx' and Sx" and incremental positional changes of the second frame 2.1 along the path Sy with end points Sy' and Sy". The displacement path is elucidated by a double-headed arrow (dashed line). The incremental change in location of the scan line IV relative to the scan field 13 is preferably always implemented at the end of a vibrational or oscillation movement from reversal point to reversal point.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

REFERENCE SIGNS

M Microscope
0 Scanning device
1 First scanner
1.1 First quasi-static scanner (first frame)
1.2 First scanning mirror
2 Second scanner
2.1 Quasi-static scanner (second frame)
2.2 Scanning mirror
3 First oscillation axis
4 Second oscillation axis
5 Drive
6 Controller
7 Sample
8 Position detector
9 Light source
10 Beam splitter
11 Pinhole 12 Detector
13 Scan field
I, . . . , IV Scan row
An, Bn Amplitudes
Sx, Sy Quasi-static deflection
α Angle of rotation

What is claimed is:

1. Scanning device for scanning a scan field, comprising a first scanner and a second scanner,
each with a frame that is movable about a first oscillation axis and, held in said frame, a scanning mirror that can be excited resonantly to vibrate about a second oscillation axis,
wherein the scanners are arranged in a beam path and imaged onto one another;
and their respective spatial and temporal alignment are matched to one another by means of a controller and by means of drives of the scanners connected therewith, for the purpose of scanning the scan field;
wherein
each scanner is a 2-axis scanner whose respective first oscillation axis is directed orthogonally to the respective second oscillation axis.

2. Scanning device according to claim 1, wherein said scanners are arranged at a respective angle of incidence of 45° with respect to the beam path.

3. Scanning device according to claim 1, wherein said scanners are the same.

4. Scanning device according to claim 1, further comprising position detectors for acquiring a current amplitude and phase of each resonant scanning mirror and control-connected to the controller.

5. Scanning device according to claim 1, wherein the controller is configured to regulate the respective amplitudes and phases of the scanning mirrors of the first scanner and of the second scanner, wherein the respective amplitudes are set dependent on a currently selected alignment of the scan field.

6. Scanning device according to claim 5, wherein the controller is configured to regulate the respective positions of the frames.

7. Method for operating a scanning device according to claim 1, comprising the following steps:
defining a current scan field to be scanned;
defining a scanning regime, according to which the scan field is intended to be scanned in space and/or in time;
ascertaining the first and second amplitudes, which are required for the scanning according to the selected scanning regime, and the required phases of the first and second scanning mirrors,
ascertaining the respective positions of the frames required for scanning the current scan field,
scanning the scan field by means of at least one created scan line by virtue of the movements of the scanning mirrors being superimposed on one another,
and optionally offsetting the scan line in order to scan the scan field.

* * * * *

UNITED STATES PATENT AND TRADEMARK OFFICE
CERTIFICATE OF CORRECTION

| | |
|---|---|
| PATENT NO. | : 12,436,381 B2 |
| APPLICATION NO. | : 18/601854 |
| DATED | : October 7, 2025 |
| INVENTOR(S) | : Jörg Steinert |

It is certified that error appears in the above-identified patent and that said Letters Patent is hereby corrected as shown below:

In the Specification

Column 1, Line 9 now reads: "Mar. 14, 2023"
Should read: -- March 14, 2023 --

Column 4, Line 31 now reads: "rotation of 0 degrees For example,"
Should read: -- rotation of 0 degrees for example, --

Column 4, Line 59 now reads: "(see also FIG. 3 in this respect)."
Should read: -- (see also Fig. 3 in this respect). --

Column 5, Line 52 now reads: "FIG. 1"
Should read: -- Fig. 1 --

Column 5, Line 54 now reads: "FIG. 2"
Should read: -- Fig. 2 --

Column 5, Line 57 now reads: "FIG. 3"
Should read: -- Fig. 3 --

Column 5, Line 60 now reads: "FIG. 4"
Should read: -- Fig. 4 --

Column 5, Line 66 now reads: "FIG. 1"
Should read: -- Fig. 1 --

Column 6, Line 10 now reads: "FIG. 1"
Should read: -- Fig. 1 --

Signed and Sealed this
Thirteenth Day of January, 2026

John A. Squires
*Director of the United States Patent and Trademark Office*

CERTIFICATE OF CORRECTION (continued)
U.S. Pat. No. 12,436,381 B2

Column 6, Line 16-17 now reads: "FIG. 1"
Should read: -- Fig. 1 --

Column 6, Line 19 now reads: "M (FIG. 2), for example"
Should read: -- M (Fig. 2), for example --

Column 6, Line 35-36 now reads: "(see FIGS. 3 and 4)"
Should read: -- (see Figs. 3 and 4) --

Column 7, Line 15 now reads: "FIG. 3 for a few cases."
Should read: -- Fig. 3 for a few cases. --

Column 8, Line 24 now reads: "FIG. 4"
Should read: -- Fig. 4 --